UNITED STATES PATENT OFFICE.

CHARLES N. FORREST, OF BROOKLYN, NEW YORK, ASSIGNOR TO THE BARBER ASPHALT PAVING COMPANY, OF PHILADELPHIA, PENNSYLVANIA, A CORPORATION OF WEST VIRGINIA.

BREWER'S PITCH.

No. 877,888.

Specification of Letters Patent.

Patented Jan. 28, 1908.

Application filed December 22, 1906. Serial No. 349,175.

*To all whom it may concern:*

Be it known that I, CHARLES N. FORREST, a citizen of the United States, and a resident of Brooklyn, in the county of Kings and State of New York, have invented certain new and useful Improvements in Brewers' Pitch, of which the following is a specification.

Malted liquors require peculiarly clean and cleansable receptacles; and yet owing to trade usages, empty beer packages or kegs after being exposed to atmospheric influences and dust during transit, must be used over again, notwithstanding that the dregs remain in them, and usually have become sour or dirty. For the purposes of facilitating the cleaning of such receptacles for malted liquors and for the purpose of keeping them biologically clean and free from taste or odor, it is customary to apply to the inner surfaces of brewer's wooden or metal receptacles (such as vats, barrels and kegs in which beer, ale and other malt liquors are stored while aging in the brewery or being served to the trade), a coating which is commonly called "brewer's pitch." The substance is, perhaps, not a true pitch; but it will be understood that I use the name "brewer's pitch" in its trade—rather than in its scientific—designation as covering any substance suitable for the purposes of coating these receptacles, and having the functions which I have described.

The ordinary brewer's pitch heretofore employed is a preparation of colophony, or common rosin, which is applied to the inside of the kegs, by heating and spraying it upon the surface. It tends to preserve the wood from decay, but its main purpose is to provide a smooth and, therefore, cleansable surface for the inside of the keg to which impurities will not adhere, and from which all contaminated contents may easily be removed. Colophony has the further desirable property of being mildly antiseptic. A difficulty which has heretofore been experienced with this brewer's pitch results from the fact that colophony is acted upon by water, and is exceeding soluble in alcohol, consequently the coating applied to the interior of the keg is soon disintegrated and has to be removed. Furthermore, the extended use of colophony in other arts, conjoined with the depletion of the pine forests, has rendered it an expensive material, making it difficult for brewers to supply their requirements for the same economically.

I have discovered that a brewer's pitch may be made from a native bitumen which will have all the desirable properties of that heretofore made from colophony, with the additional advantage of a much longer life, resulting from the fact that the native bitumens are not soluble in either water or dilute alcohol. The native bitumens which I have found to be suitable as the basis for the preparation of my improved brewer's pitch, are those which are classified as the hard native bitumens, particularly manjak, (a hard bitumen found in the Islands of Barbadoes), gilsonite, grahamite, and wurtzilite. These are hard, tasteless, odorless and comparatively free from mineral matter (not more than one per cent.), in which respect they differ from other bitumens which would therefore be unsuitable for the purposes of my invention.

In order to prepare a brewer's pitch from these bitumens, I combine the bitumen with a suitable tempering agent, and, also, preferably, with a suitable antiseptic substance. When thus prepared my brewer's pitch is superior to those heretofore employed in all the properties which are desired in this sort of an article. It will remain in contact with malt liquor indefinitely without, on the one hand, being dissolved or disintegrated; and, on the other hand, without imparting any odor or taste thereto. Furthermore, on account of the extensive natural deposits of these hard native bitumens, the material may be cheaply prepared.

In practicing my invention I fuse in a suitable vessel, by means of heat, one or more of the hard native bitumens having the characteristics enumerated above, and add to it a suitable tempering agent. The function of the tempering agent is to impart to the bitumen the requisite physical qualities to adapt it for use as a brewer's pitch, that is to say, the temperature at which the bitumen becomes sufficiently fluid to allow of its application to the interior of the receptacle must be a comparatively low one, say about 150 or 200 degrees F., and yet the composition must at ordinary atmospheric temperature, be hard but not excessively brittle; it must possess some ductility, but must not soften or flow under summer heat: it must be adhesive; and it must present a smooth and glassy surface, which is readily cleansed. These qualities are those which are possessed naturally by the hard bitumen except the capacity to be readily liquefied. It will therefore be seen that the tempering agent must be one which lowers the temperature at which the bitumen becomes fluid without substantially softening it at atmospheric temperatures or otherwise altering its valuable characteristics.

I have found that wax or wax tailings are the most suitable forms of tempering agents, by the addition of which to the bitumen these needed qualities may be imparted. I prefer, however, to employ what is known as wax tailings, (sometimes called "petroleum wax," or "still wax"), a substance which is the product of the destructive distillation of the denser portions of paraffin petroleum. As a tempering agent, either of these materials may be employed without dilution, or, may be combined with petroleum pitch, candle tar (stearin pitch) or other by-product tars or bituminous substances, these combinations being dependent, to some extent, upon the variations in the selection of the hard native bitumens which are used as the basic material, and which vary according to the available supply of the same.

In addition to the tempering agent, I find that it is desirable to add a certain amount of a mixture of colophony and rosin oil. This imparts its antiseptic qualities to the pitch. Usually a mixture in about equal parts of colophony and rosin oil will be suitable, the proportions varying according to the viscosity of the rosin oil.

While the proportions of the components which I have mentioned may vary, I find that I secure the best results by combining from thirty-five per cent. to fifty per cent. of a hard native bitumen with from fifteen to twenty-five per cent. of the tempering agent (such as wax tailings or wax tailings combined with other substances); and thirty-five to forty per cent. of a mixture of colophony and rosin oil. The brewer's pitch thus prepared possesses all the desirable properties required for a brewer's pitch. It melts to a proper consistency for application at a moderate temperature so that it may be easily applied by spraying within the receptacle; it provides the smooth, hard, durable, elastic, cleanly and cleansable coating which is required; and is also mildly antiseptic, lacking any taste or odor; and has a longer life than the pitches heretofore employed by reason of its insolubility in both water and alcohol. When it is desired to apply this pitch to large tanks or vats, or other receptacles, which cannot be reached by the pitching devices heretofore referred to, the pitch may be diluted in an equal proportion by weight of turpentine or petroleum spirits, bringing it to a consistency which will permit it being applied with a paint brush. Obviously, under these circumstances, the turpentine being extremely volatile, acts merely as a vehicle and largely evaporates, and plays no substantial part in the composition of the brewer's pitch.

I am aware that it has heretofore been proposed to combine Trinidad asphalt (which is a native bitumen containing about 35% of mineral matter), with a suitable fluxing agent for the formation of a waterproof composition. But the presence of the mineral matter in Trinidad asphalt, as well as its characteristic odor and taste, render such a composition wholly unsuitable for use as a brewer's pitch.

Having thus described my invention, I claim:—

1. A brewer's pitch comprising a hard bitumen free from mineral matter, and a tempering agent which lowers the temperature at which the bitumen becomes fluid but which does not render it soft at atmospheric temperatures.

2. A brewer's pitch comprising a hard bitumen free from mineral matter, and wax tailings as a tempering agent, substantially as described.

3. A brewer's pitch comprising a hard bitumen free from mineral matter, and a suitable tempering agent composed of wax tailings combined with a petroleum pitch.

4. A brewer's pitch comprising a hard bitumen; a tempering agent which lowers the temperature at which the bitumen becomes fluid but which does not render it soft at atmospheric temperatures; and an antiseptic substance.

5. A brewer's pitch comprising a hard bitumen as a base; wax tailings as a tempering agent; and a mixture of colophony and rosin oil; all combined in about the proportions specified.

6. A brewer's pitch comprising a hard native bitumen such as manjak, gilsonite, grahamite or wurtzilite; and a tempering agent which lowers the temperature at which the bitumen becomes fluid but which does not render it soft at atmospheric temperatures.

In testimony whereof, I have hereunto signed my name, at Long Island City, New York, this 20th day of December, 1906.

CHARLES N. FORREST.

Witnesses:
CLIFFORD RICHARDSON,
M. P. ENNIS.